United States Patent [19]

Katoh et al.

[11] Patent Number: 5,564,519
[45] Date of Patent: Oct. 15, 1996

[54] FOUR-WHEEL TRAVELING SYSTEM FOR TIPPER

[75] Inventors: Masaya Katoh; Nobuki Hasegawa; Hiroyuki Ando; Koichi Oka; Satoshi Ogawa, all of Kanagawa, Japan

[73] Assignee: Kabushiki Kaisha Komatsu Seisakusho, Tokyo, Japan

[21] Appl. No.: 436,475

[22] PCT Filed: Oct. 22, 1993

[86] PCT No.: PCT/JP93/01532

§ 371 Date: May 23, 1995

§ 102(e) Date: May 23, 1995

[87] PCT Pub. No.: WO94/12363

PCT Pub. Date: Sep. 6, 1994

[30] Foreign Application Priority Data

Nov. 24, 1992 [JP] Japan .................................. 4-313498
Nov. 24, 1992 [JP] Japan .................................. 4-313500
Nov. 24, 1992 [JP] Japan .................................. 4-313506
Nov. 24, 1992 [JP] Japan .................................. 4-313512
Nov. 24, 1992 [JP] Japan .................................. 4-313520
Nov. 24, 1992 [JP] Japan .................................. 4-313522

[51] Int. Cl.⁶ .................................................. B60K 28/16
[52] U.S. Cl. ........................................ 180/243; 180/197
[58] Field of Search ................................... 180/242, 243, 180/197, 308; 364/424.05, 424.1

[56] References Cited

U.S. PATENT DOCUMENTS

| | | | |
|---|---|---|---|
| 4,236,595 | 12/1980 | Beck et al. | 1880/197 X |
| 4,399,886 | 8/1983 | Pollman | 180/197 |
| 4,402,377 | 9/1983 | Brooks et al. | 180/197 |
| 4,444,286 | 4/1984 | Hawkins et al. | 180/243 X |
| 5,147,010 | 9/1992 | Olson et al. | 180/243 X |
| 5,361,208 | 11/1994 | Olson et al. | 180/243 X |
| 5,368,120 | 11/1994 | Sakai et al. | 180/243 X |
| 5,420,791 | 5/1995 | Olson et al. | 180/243 X |

FOREIGN PATENT DOCUMENTS

| | | |
|---|---|---|
| 61769/86 | 3/1987 | Australia . |
| 4210251 | 9/1993 | Germany . |
| 54-126336 | 10/1979 | Japan . |
| 63-126132 | 8/1988 | Japan . |
| 63-258223 | 10/1988 | Japan . |
| 2-20453 | 1/1990 | Japan . |
| 5-16687 | 1/1993 | Japan . |
| 5-38961 | 2/1993 | Japan . |

*Primary Examiner*—Kevin Hurley
*Attorney, Agent, or Firm*—Wenderoth, Lind & Ponack

[57] ABSTRACT

In a four-wheel drive traveling system for a tipper, an output side of an engine is connected to rear wheels via a power transmission, at least one variable hydraulic motor for driving the front wheels and a hydraulic pump driven by the engine are provided, and the variable hydraulic pump and the variable hydraulic motor are connected into a closed circuit. The system includes arrangements for controlling displacement of the variable hydraulic pump, for detecting slippage of the rear wheels, for setting a discharge pressure of the hydraulic pump between a high pressure and a low pressure, and for controlling the displacement of the variable hydraulic pump so that the discharge pressure is a low pressure while slippage is not caused for the rear wheels and so that the discharge pressure is a high pressure while slippage is caused for the rear wheels.

10 Claims, 11 Drawing Sheets

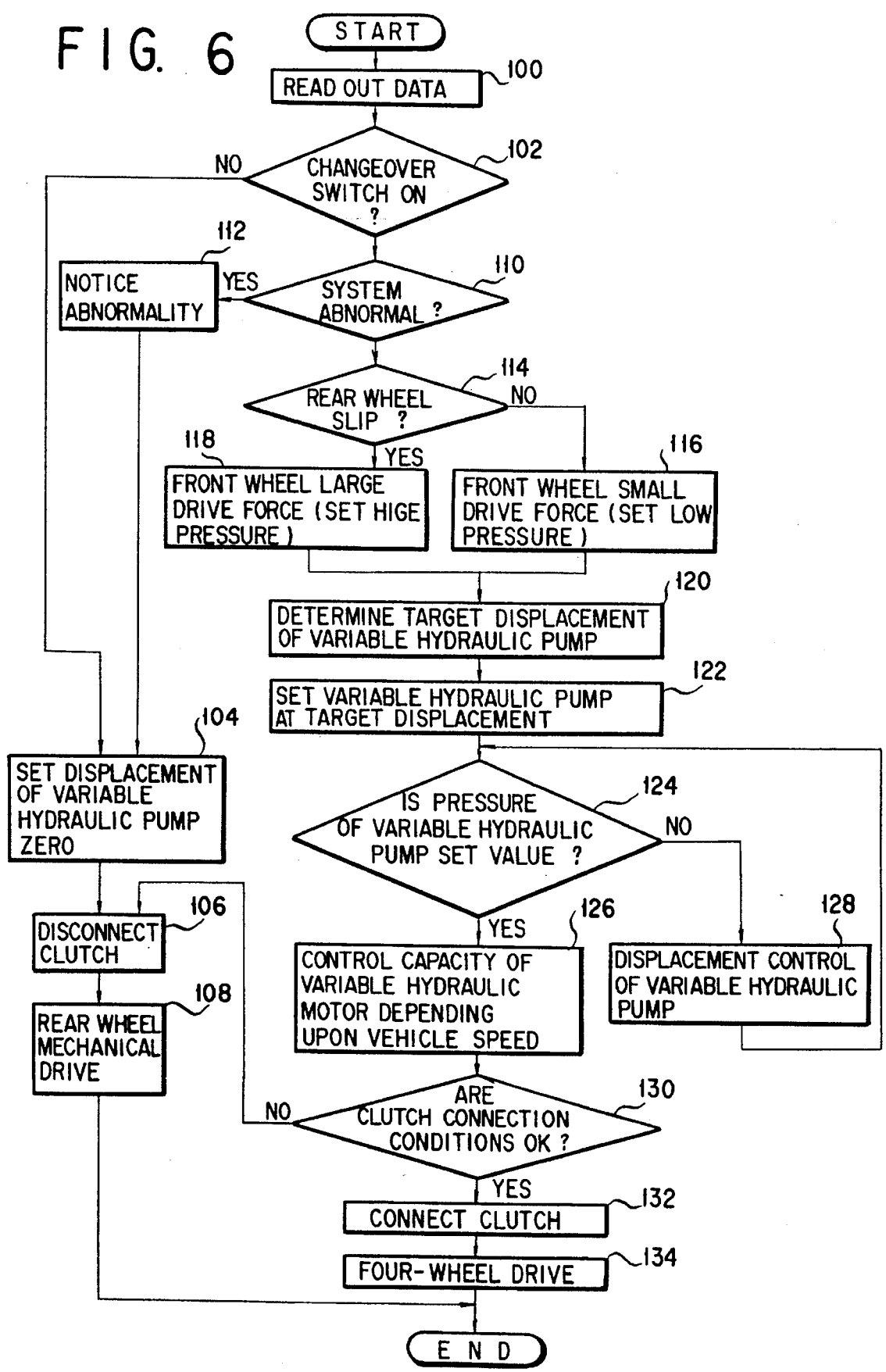

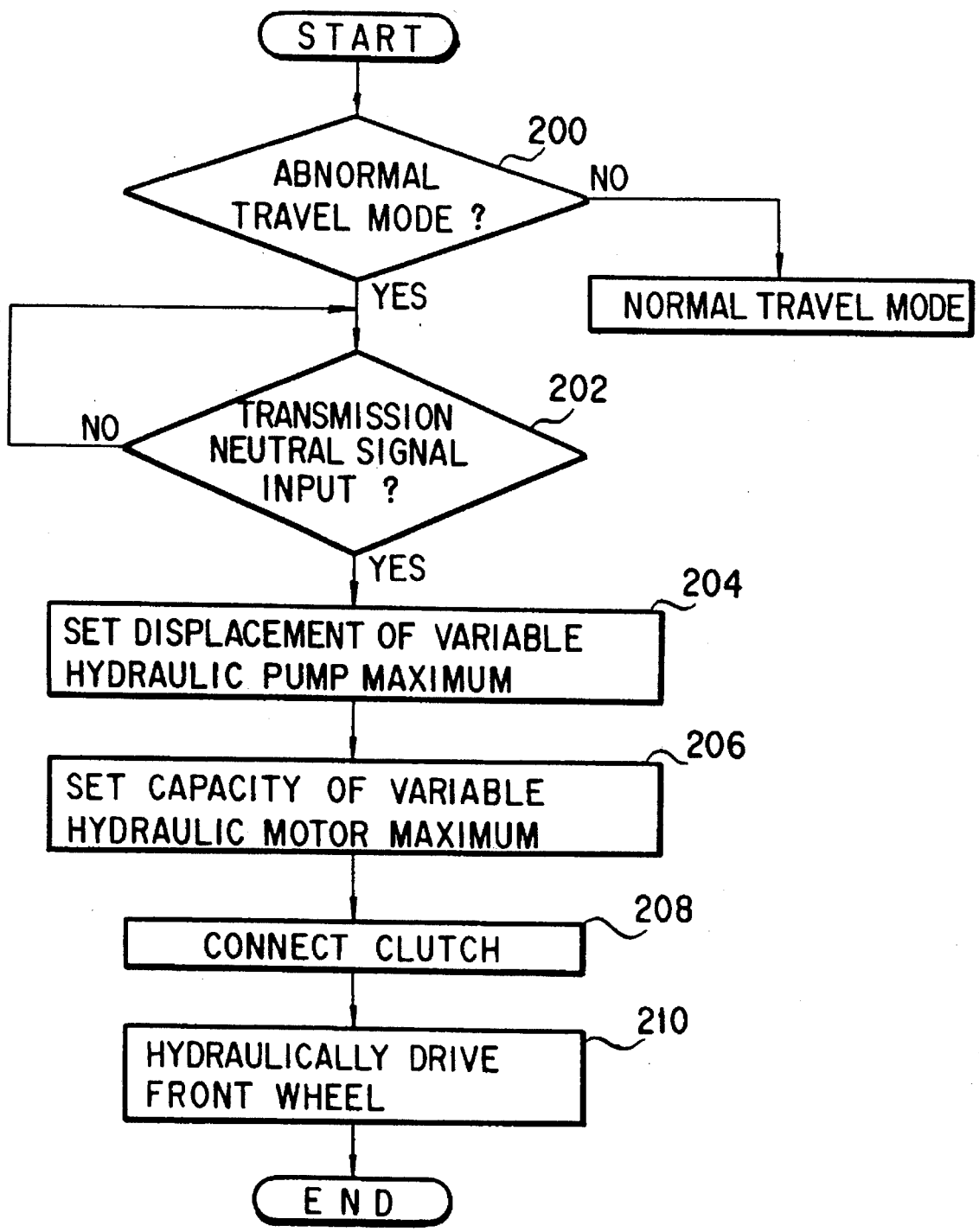

FOUR-WHEEL TRAVELING SYSTEM FOR TIPPER

TECHNICAL FIELD

The present invention relates to a four-wheel traveling system for a tipper such as a large construction dump truck and so forth. More specifically, the invention relates to a drive system for a tipper, in which rear wheels are driven by a driving force developed by an internal combustion engine and front wheels are driven by a variable hydraulic motor driven by hydraulic pressure supplied from a hydraulic pressure source driven by output torque of the internal combustion engine.

BACKGROUND ART

A large constructing dump truck as one form of a tipper has steerable fronts wheel and driving rear wheels mounted on a vehicle body, and also has a tiltable rear body. A typical known traveling system for such a dump truck mechanically drives the driving rear wheels by transmitting an output of an internal combustion engine, such as a diesel engine (hereinafter simple referred to as "engine") via a power transmission.

As a traveling system of a normal on-the-road vehicle, Japanese Unexamined Patent Publication (Kokai) NO. Showa 63-258223, for example, discloses a mechanical and hydraulic type four-wheel drive traveling system, in which an output torque of the engine is mechanically transmitted to the rear wheels via the power transmission, a variable hydraulic pump is driven by the output torque of the engine, and the front wheels are driven by a variable hydraulic motor driven by the discharged pressurized fluid of the hydraulic pump. Similarly, Japanese Unexamined Patent Publication No. Showa 61-191429 also proposes a four-wheel drive system for a vehicle, in which one of the front and rear wheels are driven by a hydraulic drive system.

In the traveling system having a drive system exclusively employing the mechanical drive system, a traction force can be lowered when slippage is caused on the driving rear wheels. Therefore, such drive system has low performance in traveling ability in a muddy area or in hill-climbing.

Conversely, with the four-wheel drive traveling system, in which the mechanical drive system and a hydraulic drive system are combined, traveling ability in muddy areas and hill-climbing performance can be improved. However, in such system, it becomes necessary to synchronize the rear wheels and front wheels. In the prior art, in detecting wheel slippage at the rear wheels, the displacement of the variable hydraulic pump and the capacity of the variable hydraulic motor are set at zero so as not to drive the front wheel, while no slippage is caused on the rear wheels, and the displacement of the variable hydraulic pump and the capacity of the variable hydraulic motor are varied to adjust the hydraulic force to a reference value to transmit the driving force to the front wheel.

Therefore, the displacement of the hydraulic pump and the capacity of the hydraulic motors are increased from zero after occurrence of wheel slippage on the rear wheels and varied against the certain hydraulic force as a reference value, to drive the front wheels. This causes time lag from occurrence of wheel slippage on the rear wheels to driving of the front wheels to make smooth traveling impossible.

This difficulty in providing smooth traveling is particularly significant in the case of a tipper having several of tens tons of movable load.

On the other hand, as set forth above, in the four-wheel traveling system, the wheel rotation speed on the front wheels is determined by the discharge amount of the variable hydraulic pump and the capacity of the variable hydraulic motor. Here, provided that the pump displacement is constant, the discharge amount of the hydraulic pump is determined by the engine revolution speed. Accordingly, the wheel rotation speed of the front wheels is variable depending upon the engine revolution speed. On the other hand, the wheel rotation speed of the rear wheels is determined by the engine revolution speed and a speed ratio of the power transmission. Therefore, provided that the engine revolution speed is constant, the wheel rotation speeds of the front wheels and the rear wheels may be differentiated at different speed ratios of the power transmission.

In order to solve the above-mentioned problem, the system disclosed in the above-identified Japanese Unexamined Patent Publication No. Showa 61-191429 is provided with an auxiliary hydraulic pump at the output side of the power transmission to supply the discharged pressurized fluid of the auxiliary pump to the variable hydraulic motor for varying the fluid amount to be supplied to the variable hydraulic motor depending upon the speed ratio of the power transmission so that the rotation speeds of the front and rear wheels are matched even at different speed ratios.

However, in such construction, the cost becomes high for installation of the expensive auxiliary pump, and piping becomes complicated.

Also, for four wheel driving travel in which rotation speed of the front and rear wheels is synchronized by controlling displacement of the variable hydraulic pump and the capacity of the variable hydraulic motor, the displacement of the variable hydraulic pump and the capacity of the variable hydraulic motor in the four-wheel drive traveling system are controlled for establishing synchronization with the wheel rotation speed on the rear wheels. In the above-mentioned four wheel drive type traveling system, when an abnormality or failure is caused in a mechanical transmission system mechanically connecting the engine and the rear wheels, such as failure of a torque converter or the power transmission, drop out or damaging of a propeller shaft, failure in a differential gear box and so forth, the rear wheel cannot be driven by the engine.

In this case, since the displacement of the variable hydraulic pump and the capacity of the variable hydraulic motor cannot be controlled, the front wheels cannot be driven hydraulically. Therefore, the vehicle cannot travel.

On the other hand, considering the shifting operation of the power transmission provided in the mechanical drive system, upon shifting, the engine revolution speed is abruptly lowered by releasing of the accelerator at initiation of shifting and the engine revolution speed is abruptly increased by depression of the accelerator after completion of shifting. Therefore, in shifting the speed ratio, the engine revolution speed is varied abruptly. Therefore, upon shifting, the discharge amount of the variable hydraulic pump is abruptly varied to cause abrupt variation of the supply flow rate for the variable hydraulic motor to cause abrupt variation of torque of the variable hydraulic motor to prevent optimization of the front wheel driving force to cause difficulty in smooth traveling.

For instance, assuming that the discharge amount of the variable hydraulic pump is set at a value capable of maintaining the torque of the variable hydraulic motor at a certain value during travel before shifting, the discharge amount of the variable hydraulic pump is lowered by the abrupt drop of the engine revolution speed upon shifting to make it impossible to maintain the torque of the variable hydraulic motor at the certain value to cause lowering of the driving force on the front wheels. When the decrease of the discharge amount of the variable hydraulic pump is significant, the hydraulic motor is driven in reverse by the inertia on the traveling vehicle through the front wheels to cause a pumping effect to increase resistance for revolution of the hydraulic pump to further lower the engine revolution speed.

On the other hand, in this kind of four-wheel drive type traveling system, it is possible to cause failure or fluid leakage in the variable hydraulic pump, the variable hydraulic motor and the closed circuit connecting the variable hydraulic pump and the variable hydraulic motor. When four wheel drive traveling is performed without knowing of a failure or fluid leakage, damaging of various portions and increasing of fluid leakage will likely be caused.

SUMMARY OF THE INVENTION

The present invention has as its objects to solve the above-mentioned problems. Therefore, it is an object of the present invention is to provide a four-wheel drive traveling system for a tipper which can minimize lag in response of a hydraulic drive system at the occurrence of wheel slippage on rear wheels, and enable smooth traveling on a traveling path having small friction, such as a muddy area, an icy area and so forth.

Another object of the present invention is to provide a four-wheel drive traveling system for a tipper which enables variation in the wheel rotation speed of front wheels depending upon the speed ratio of a power transmission in a mechanical drive system, without requiring an auxiliary hydraulic pump.

A further object of the present invention is to provide a four-wheel drive traveling system for a tipper which can prevent abrupt variation of a driving force on the front wheels in the case where the discharge amount of the hydraulic pump is varied due to abrupt variation of the engine revolution speed caused by shifting operation of the power transmission of the mechanical system.

A still further object of the invention is to provide a four-wheel drive traveling system for a tipper which can enable traveling of the vehicle even when failure is caused in a mechanical drive system by making it possible to control a hydraulic drive system independently of the mechanical drive system.

A yet further object of the invention is to provide a four-wheel drive traveling system for a tipper which can detect failure or leakage of a working fluid in the hydraulic drive system.

In order to accomplish the above-mentioned objects, according to the first aspect of the invention, a four-wheel drive traveling system for a tipper, in which an output side of an engine is connected to rear wheels via a power transmission, a variable hydraulic motor for driving the front wheels and a hydraulic pump driven by the engine are provided, and the variable hydraulic pump and the variable hydraulic motor are connected into a closed circuit, comprises:

means for controlling displacement of the variable hydraulic pump;

means for detecting slippage of the rear wheels;

means for setting a discharge pressure of the hydraulic pump between a high pressure and a low pressure; and means for controlling the displacement of the variable hydraulic pump so that the discharge pressure is a low pressure while slippage is not caused for the rear wheels and so that the discharge pressure is a high pressure while slippage is caused for the rear wheels.

In the construction set forth above, when no slippage is caused for the rear wheels, the discharge pressure of the variable hydraulic pump becomes a low pressure to make the drive force on the front wheels small. Therefore, the engine output will not be wasted. When slippage is caused for the rear wheels, the discharge pressure of the variable hydraulic pump becomes a high pressure to make the drive force on the front wheels large. Therefore, traveling ability in a muddy area and hill-climbing performance can be improved. Also, since the drive force for the front wheels is varied between large and small by adjusting the discharge pressure of the variable hydraulic pump between high and low pressures, the drive forge of the front wheels can be increased without time lag, to permit smooth traveling.

According to the second aspect of the invention, a a four-wheel drive traveling system for a tipper, in which an output side of an engine is connected to rear wheels via a power transmission, at least one variable hydraulic motor for driving the front wheels and a hydraulic pump driven by the engine are provided, and the variable hydraulic pump and the variable hydraulic motor are connected into a closed circuit, a front wheel driving force control system comprises:

means for controlling displacement of the variable hydraulic pump;

means for setting an input pressure of the variable hydraulic pump;

means for detecting an actual input pressure of the variable hydraulic motor; and means for outputting a displacement control signal for the displacement control means on the basis of a difference between the actual input pressure and the set input pressure.

In this construction, when the actual input pressure of the variable hydraulic motor is different from the set input pressure, the displacement of the variable hydraulic pump is controlled to adjust the input pressure of the variable hydraulic motor (or motors) for driving the front wheels at the set input pressure. Therefore, a front wheel driving force can be set by the set input pressure. Also, the variable hydraulic pump is controlled only when the actual input pressure is different from the set input pressure to make the range of displacement control narrow to improve response characteristics of the control. Also, by setting the set input pressure at a high pressure and low pressure, the torque of the variable hydraulic motor can be made large and small at short period to provide enhanced response.

According to the third aspect of the invention, in a four-wheel drive traveling system, in which an output side of an engine is connected to rear wheels via a power transmission, at least one variable hydraulic motor for driving the front wheels and a variable hydraulic pump driven by the engine are provided, and the variable hydraulic motor is driven by the discharged pressurized fluid of the hydraulic pump, a synchronization control system comprises:

means for controlling capacity of the variable hydraulic motor;

means for detecting a speed ratio range of the power transmission; and means for outputting a control signal to the capacity control means depending upon the detected speed ratio range for adjusting the capacity of the variable hydraulic motor at a value corresponding to the speed ratio range.

With the construction set forth above, since the capacity of the variable hydraulic motor becomes the value corresponding to the speed ratio (reduction ratio) of the power transmission, the revolution speed ratio of the variable hydraulic motor becomes coincident with the reduction ratio even at a constant discharge flow rate of the hydraulic pump. Thus, the wheel rotation speeds on the front and rear wheels match to each other to successfully establish synchronization.

According to the fourth aspect of the invention, in a four-wheel drive traveling system, in which an output side of an engine is connected to rear wheels via a power transmission, at least one variable hydraulic motor for driving the front wheels and a hydraulic pump driven by the engine are provided, the variable hydraulic pump and the variable hydraulic motor are connected into a circuit, a control system for use during a shifting period comprises:

a clutch for connecting the output side of the variable hydraulic motor to the front wheels;

means for controlling displacement of the variable hydraulic pump;

means for detecting a shifting operation of the power transmission; and means for disconnecting the clutch during a shifting operation on the basis of shifting operation detection signal.

Since the clutch is disconnected during shifting to make the output side of the variable hydraulic motor and the front wheels discontinuous, and the clutch is connected after shifting to connect the output side of the variable hydraulic motor and the front wheels, the drive force for the front wheels will not be varied abruptly even when the engine revolution speed is varied abruptly during shifting, to permit smooth traveling.

According to the fifth aspect of the invention, in a four-wheel drive traveling system, in which an output side of an engine is connected to rear wheels via a power transmission, at least one variable hydraulic motor for driving the front wheels and a hydraulic pump driven by the engine are provided, and the variable hydraulic pump and the variable hydraulic motor are connected into a circuit, a control system comprises:

means for controlling displacement of the variable hydraulic pump;

means for controlling the capacity of the variable hydraulic motor;

a main controller having a normal travel mode and an abnormal travel mode; and a mode change over switch, wherein during the normal travel mode; the main controller controls displacement of the variable hydraulic pump and capacity of the variable hydraulic motor depending upon a rear wheel rotation speed; and during the abnormal travel mode, the main controller controls the displacement of the variable hydraulic pump and the capacity of the variable hydraulic motor so that they are maximum when a transmission neutral position signal is input.

When the abnormal travel mode is set by the mode changeover switch and the power transmission is set at the neutral position, the displacement of the variable hydraulic pump and the capacity of the variable hydraulic motor become maximum so that the variable hydraulic motor outputs the maximum torque. Therefore, the front wheels can be driven at the maximum drive force. Thus, when an abnormality is caused in the mechanical transmission system connecting the engine and the rear wheels to make it impossible to drive the rear wheels, the vehicle may travel at the maximum traction force utilizing the variable hydraulic motor and the variable hydraulic pump.

According to the sixth aspect of the invention, in a four-wheel drive traveling system, in which an output side of an engine is connected to rear wheels via a power transmission, at least one variable hydraulic motor for driving the front wheels and a hydraulic pump driven by the engine are provided, and the variable hydraulic pump and the variable hydraulic motor are connected into a closed circuit through first and second primary circuits, an abnormality detection system for a hydraulic drive system comprises:

means for detecting pressures of the first and second primary circuits; and means for discriminating an abnormal value of the detected pressure for displaying on a display portion.

With the foregoing construction, when the pressure of the first and second primary circuits is abnormal, the operation is notified of the abnormality by having the abnormality displayed on the display portion (on display device). The operator will know of the failure or fluid leakage and so forth in the hydraulic drive system so that he will be able to avoid a serious accident which may cause damage to various parts of the system due to the continued four-wheel driving upon occurrence of an abnormality of the hydraulic drive system.

BRIEF DESCRIPTION OF THE DRAWINGS

The present invention will be understood more fully from the detailed description given herebelow and from the accompanying drawings of the preferred embodiment of the invention, which, however, should not be taken to be limiting to the present invention, but are for explanation and understanding only.

In the drawings:

FIG. 6 is a flowchart showing operation of a control system in the four-wheel drive traveling system of the invention;

FIG. 11 is a flowchart showing control operation in the abnormal traveling mode in FIG. 10.

BEST MODE FOR IMPLEMENTING THE INVENTION

The preferred embodiments of a four-wheel drive traveling system according to the present invention will be discussed hereinafter with reference to the accompanying drawings.

Figure 1:
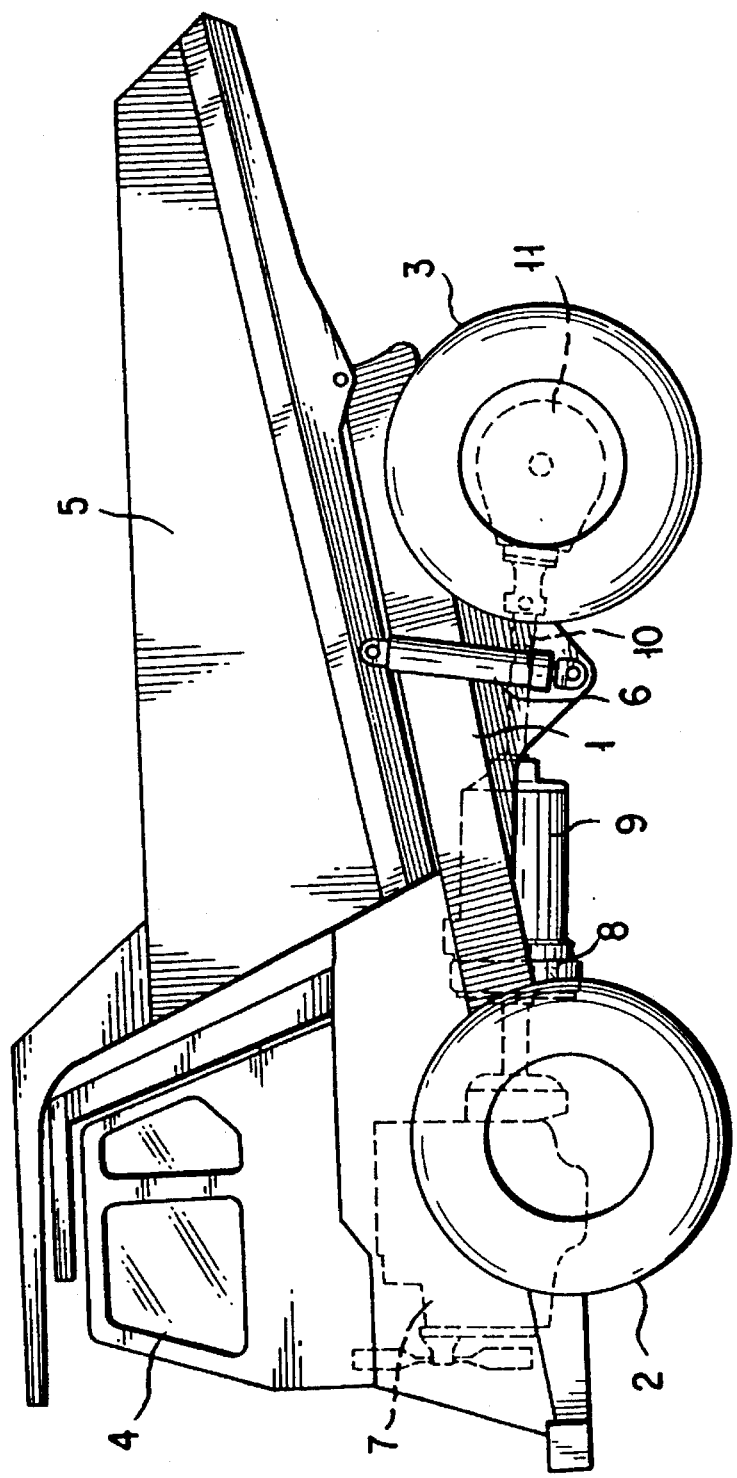
FIG. 1 is a side elevation of a tipper, in which a four-wheel drive traveling system according to the present invention is provided.

As shown in FIG. 1, at the front and rear portions of a vehicle body 1, a pair of left and right front wheels 2 and a pair of left and right rear wheels 3 are mounted. A driver's cabin 4 is provided at the front portion of the vehicle body 1. On the other hand, at the rear portion of the vehicle body 1, a rear body 5 is provided in tiltable fashion by means of a hoist cylinder 6. Thus, a large construction dump truck is constructed.

The output side of an engine 7 mounted at the front portion of the vehicle body 1 is connected to a pair of left and right rear wheels 3 via a torque converter 8, a power transmission 9, a propeller shaft 10, a differential gear box 11 and so forth. The rear wheels 3 are thus mechanically driven by means of the engine 7.

Figure 2:
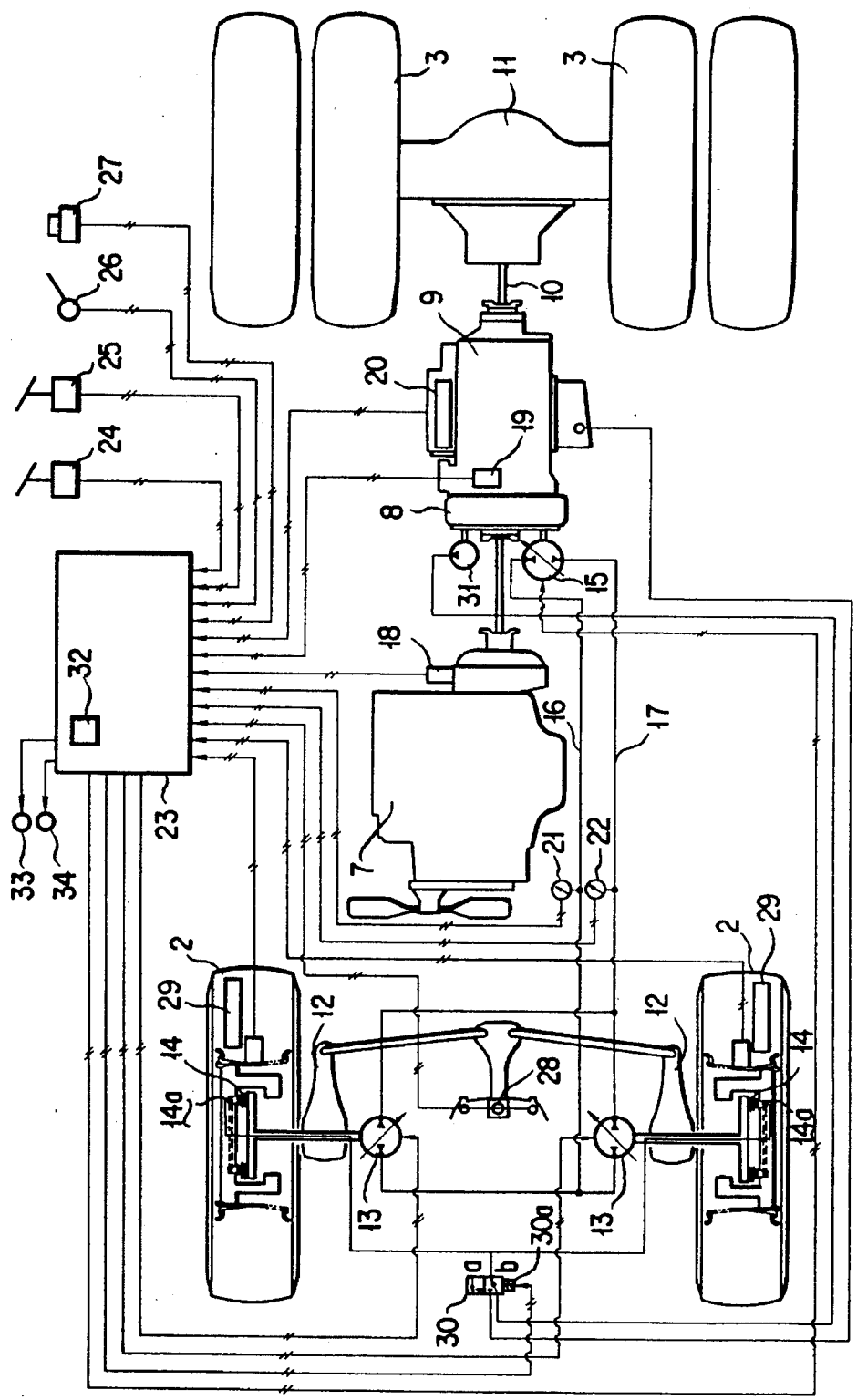
FIG. 2 is a general plan view of the preferred embodiment of the four-wheel drive traveling system according to the present invention.

As shown in FIG. 2, the front wheels 2 are rotatably supported on arms 12 which are pivotally supported on the vehicle body. On the arms 12, reversible variable hydraulic motors 13 are mounted. The output side of each of the variable hydraulic motors 13 is connected to the front wheel 2 via a clutch 14. Discharged pressurized fluid of a variable hydraulic pump 15 driven by the engine 7 is supplied to the variable hydraulic motors 13 via first and second primary circuits 16 and 17. The discharge direction of the variable hydraulic pump 15 is reversible.

As shown in FIG. 2, the engine revolution speed is monitored by an engine revolution speed sensor 18. A rotation speed of an input shaft of the power transmission 9 is monitored by an input shaft rotation sensor 19. A transmission speed range of the power transmission 9 is detected by a speed range detection sensor 20. The hydraulic pressures of the first and second primary circuits 16 and 17 are measured by first and second pressure sensors 21 and 22. The monitored and detected values are input to a main controller 23. To the main controller 23, an engine revolution speed demand signal from an accelerator sensor 24, a brake signal from a brake sensor 25, a retarder brake signal from a retarder sensor 26, four-wheel drive signal and two wheel drive signal from a changeover switch 27, a steering angle signal from a steering angle sensor 28, and a front wheel rotation speed signal from the front wheel rotation speed sensors 29.

Each of the clutches 14 is of a hydraulic actuation type and is designed to be connected when a pressurized fluid is supplied to a pressure receiving chamber 14a and to be disconnected when the pressurized fluid is drained toward a reservoir tank. A discharge fluid from an auxiliary hydraulic pump 31, such as a torque converter charge pump or so forth, is supplied to the pressure receiving chamber 14a via a clutch switching valve 30. The clutch switching valve 30 is designed to be switched from a drain position a to a supply position b by supplying an electric power to a solenoid 30a.

Figure 3:
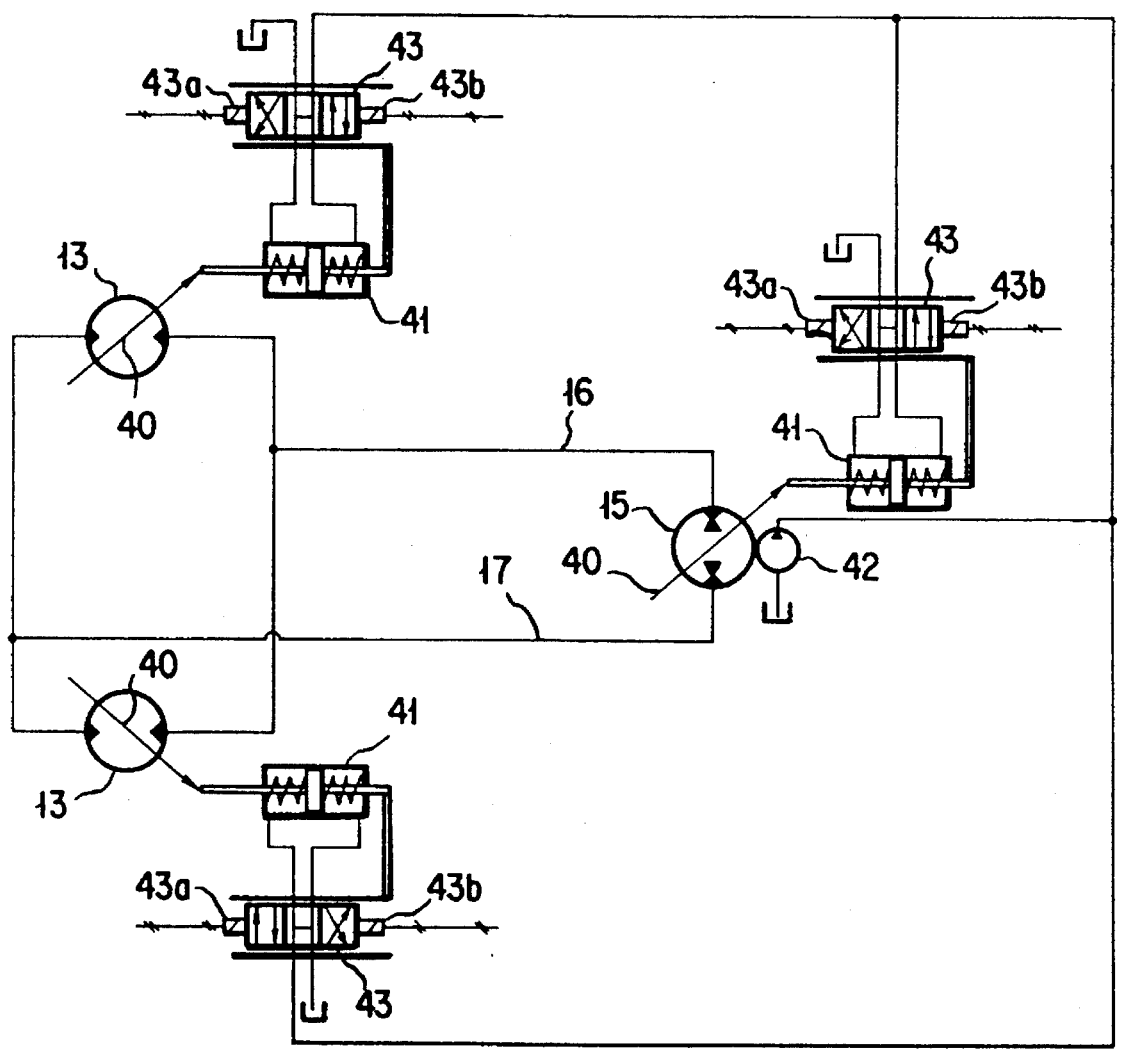
FIG. 3 is a hydraulic circuit diagram for a variable hydraulic pump and variable hydraulic motors in the preferred embodiment of the four-wheel drive traveling system of the present invention.

Each of the variable hydraulic motors 13 and the variable hydraulic pump 15 has a capacity or displacement control members 40, as shown in FIG. 3. The capacity or displacement control members 40 is designed to be actuated in forward and reverse directions by means of a cylinder 41 for controlling the capacity or displacement to be increased or decreased. To the cylinder 41, a discharged pressurized fluid of the controlling hydraulic pump 42 is supplied via an electromagnetic proportioning valve 43. To first and second solenoids 43a and 43b of the electromagnetic proportioning valve 43, the main controller 23 outputs electric signals.

For instance, when the electric power is applied to the first solenoid 43a, the displacement control member 40 is actuated in the forward direction so that the variable hydraulic pump 15 discharges the pressurized fluid to the first primary circuit 16 to drive the respective variable hydraulic motor 13 in the forward direction. On the other hand, when power is supplied to the second solenoid 43b, the displacement control member 40 is actuated in the reverse direction so that the variable hydraulic pump 15 discharges the pressurized fluid to the second primary circuit 17 to drive the respective variable hydraulic motor 13 in the reverse direction. The displacement is proportional to the magnitude of power supplied to the first and second solenoids 43a and 43b.

Next, synchronization control of rotation speeds of the front and rear wheels 2 and 3 will be discussed.

Figure 4A:
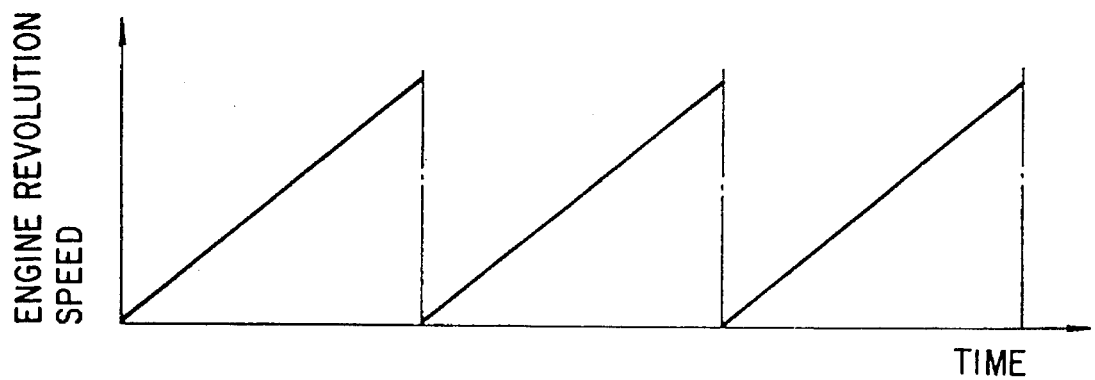
FIGS. 4(a), 4(b) and 4(c) are illustrations showing a wheel rotation speed of rear wheels in the preferred embodiment of the four-wheel drive traveling system of the invention.
Figure 4B:
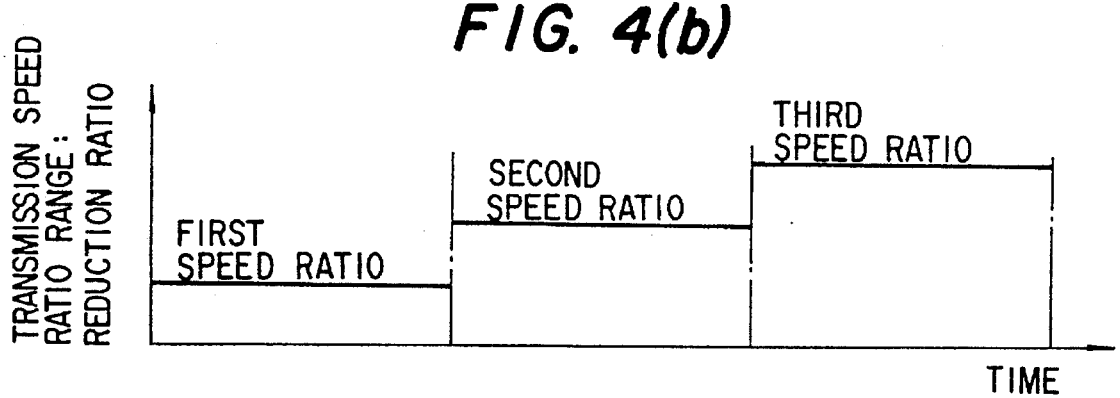
Figure 4C:
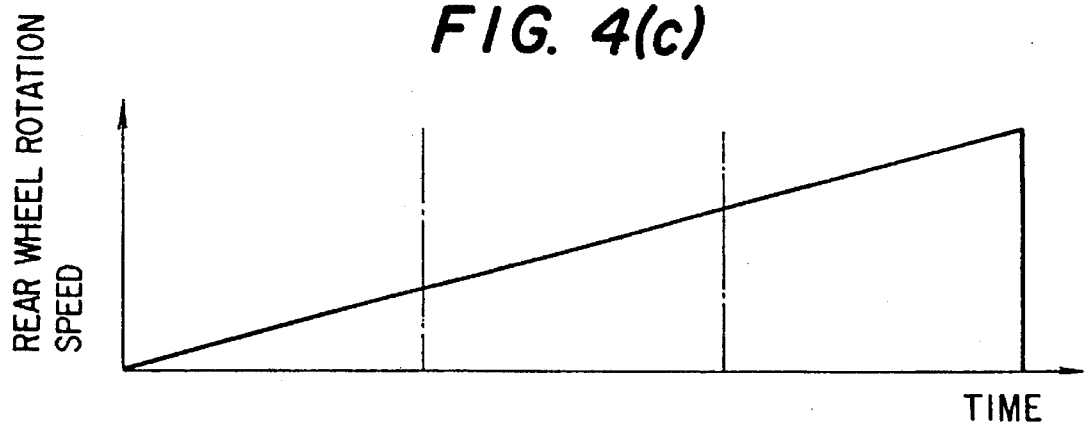

The rotation speed of the rear wheel 3 is controlled along a straight line having a certain angle by the engine revolution speed and the transmission speed ratio (reduction ratio) of the power transmission 9, as shown in FIG. 4.

Figure 5A:
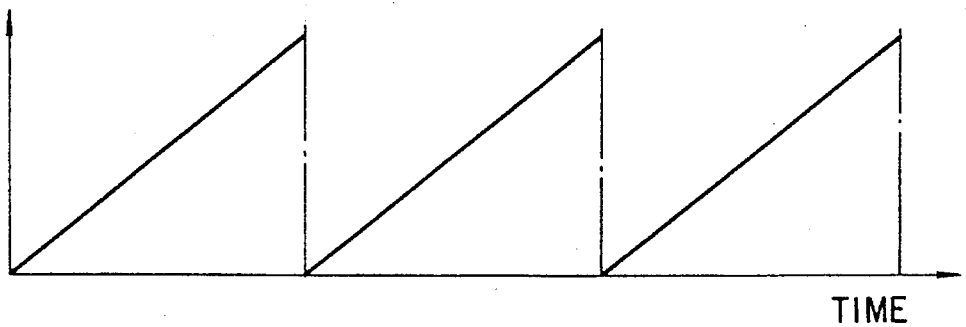
FIGS. 5(a), 5(b) and 5(c) are illustrations showing wheel rotation speed of front wheels in the preferred embodiment of the four-wheel drive traveling system of the invention.
Figure 5B:
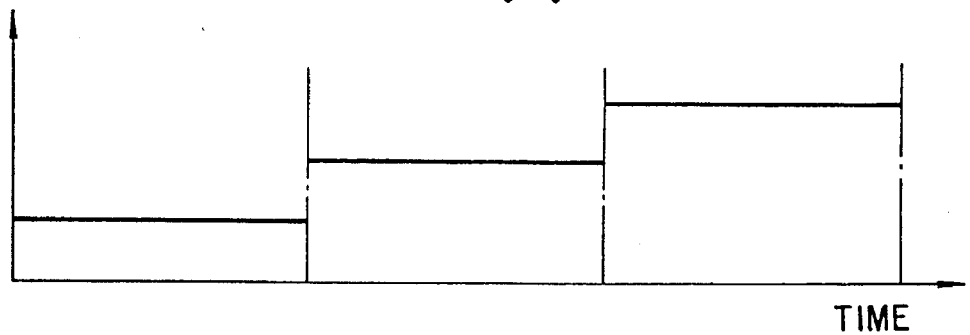
Figure 5C:
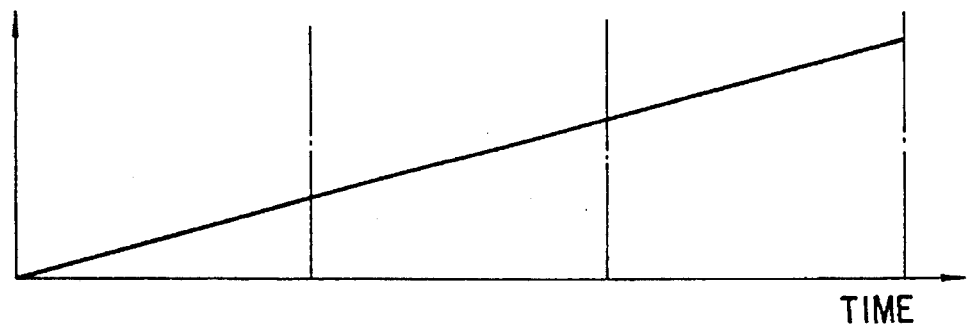

In four-wheel drive mode, the power is supplied to the first solenoid 43a of the electromagnetic proportioning valve 43 from the main controller 23 to maintain the displacement of the variable hydraulic pump 15 constant. By this, the discharge amount of the variable hydraulic pump 15 becomes as illustrated in FIG. 5.

To the main controller 23, the speed ratio of the power transmission 9 is input from the speed range detection sensor 20. On the basis of the input speed ratio, a current is output to the first solenoid 43a of the electromagnetic proportioning valve 43 of each of the variable hydraulic motors 13 to adjust the capacity of the variable hydraulic motors 13 corresponding to the speed ratio.

Namely, when the power transmission is in a first speed ratio range, the magnitude of the power supply for the first solenoid 43a of the electromagnetic proportioning valve 43 becomes large to make the capacity of the variable hydraulic motors 13 large to drive them at a low speed. When the power transmission is in second speed ratio range, the magnitude of power supply for the first solenoid 43a of the electromagnetic proportioning valve 43 is adjusted to be medium for driving the variable hydraulic motors 13 at a medium speed. On the other hand, when the power transmission is in third speed ratio range, the magnitude of power supply for the first solenoid 43a of the electromagnetic proportioning valve 43 is adjusted to be small to drive the variable hydraulic motors 13 at a high speed.

The capacity of the variable hydraulic motors 13 means a flow rate per one cycle of revolution. By setting the capacity large, the flow rate per one cycle of revolution is increased. Therefore, even when the discharge flow rate of the variable hydraulic pump 15 is constant, revolution speed is varied so that the front wheel rotation speed corresponds to a vehicle speed (rear wheel rotation speed).

More concretely, for the main controller 23, capacities are set to attain a revolution speed ratio (see FIG. 5) at constant input flow rate of each of the variable hydraulic motors 13 similar to the speed ratio at a respective speed ratio range of the power transmission are set. Therefore, depending upon the speed ratio from the speed range detection sensor 20, the capacity is selected to control magnitude of power supply for the first solenoid 43a of the electromagnetic proportioning valve 43.

By this, the rotation speed of the front wheel can be controlled along the straight line having a certain angle, as shown in FIG. 5. Therefore, the rotation speeds of the front wheels 2 and the rear wheels 3 match each other.

Assuming the speed ratio of the power transmission is 0.2 at the first speed ratio range, 0.4 at the second speed ratio range, 0.6 at the third speed ratio range, 0.8 at the fourth speed ratio range and 1.0 at the fifth speed ratio range, the capacity of the variable hydraulic motors 13 is adjusted to be 100% at the first speed ratio range, 50% at the second speed ratio range, 32% at the third speed ratio range, 25% at the fourth speed range, and 20% at the fifth speed range.

In the foregoing embodiment, the variable hydraulic pump 15 is employed; this is for controlling the discharge pressurized fluid of the variable hydraulic pump 15. It may be possible to employ a fixed displacement hydraulic pump.

It should be noted that the main controller 23 functions to detect abnormalities in the hydraulic drive system in the manner set out later. When an abnormality is detected, the clutches 14 are disconnected to make four-wheel drive traveling impossible. Then, the fact is displayed on a display device 32 and a buzzer 33 is actuated and a lamp 34 is caused to blink.

An abnormality in the hydraulic drive system is detected in each of the following cases.

While the clutches 14 are disconnected for two wheel driving, an abnormality is detected when the pressure in one of the first and second primary circuits 16, 17 is higher than or equal to a predetermined pressure. While the clutches 14 are connected for four wheel driving, an abnormality is detected when there is no difference between pressures in the first and second primary circuits 16, 17. While the clutches 14 are connected for four wheel driving, an abnormality is detected when a condition, in which the pressure in one of the first and second primary circuits 16, 17 on the driving side is low and the pressure in the other of the first and second primary circuits 16, 17 on the driven side is high, is maintained for a predetermined period. While the clutches 14 are connected for four wheel driving, an abnormality is detected when a condition, in which the pressure in one of the first and second primary circuits 16, 17 on the driving side is out of a set pressure range, is maintained for a given period or more. While the clutches 14 are connected for four wheel driving, an abnormality is detected when a condition, in which the pressures of the first and second primary circuits 16, 17 are maintained lower than a predetermined pressure, is maintained for a given period.

Next, the travel control operation in the preferred embodiment of the four-wheel drive traveling system for the tipper of the present invention will be discussed with reference to FIG. 6. It should be noted that the control routine shown in the flowchart of FIG. 6 will be executed at a given time interval, periodically.

At first, when the control routine is initiated, at a step 100, various control parameters are read out, including the engine revolution speed N, the power transmission input shaft rotation speed $T_{IN}$ detected by the input shaft rotation sensor 19, a speed ratio range $T_s$ detected by the speed range detection sensor 20, hydraulic pressures $P_1$ and $P_2$ of the first and second primary circuits 16 and 17 detected to the first and second pressure sensors 21 and 22, the engine revolution speed demand signal $N_D$ supplied from the accelerator sensor 24, the brake signal $B_B$ supplied from the brake sensor 25, a retarder brake signal $B_R$ supplied from the retarder sensor 26, the four-wheel drive mode signal $D_4$ and the two-wheel drive mode signal $D_2$ supplied from the changeover switch 27, the steering angle signal ST supplied from the steering angle sensor 28, the front wheel rotation speed signal $W_F$ from the front wheel rotation speed sensor 29 and so forth.

Next, at a step 102, discrimination of the four-wheel drive mode and the rear two-wheel drive mode is made on the basis of the drive signal $D_4$ and $D_2$ supplied from the changeover switch 27. When the changeover switch 27 is held OFF and thus the two-wheel drive signal $D_2$ is input to the main controller 23, the electromagnetic proportioning valve 43 of the variable hydraulic pump 15 is set at the neutral position to set the displacement thereof at zero, at a step 104. Then, at a step 106, the clutch switching valve 30 is set at the drain position a to disconnect the clutches 14 to allow the front wheels 2 to rotate freely from the variable hydraulic motors 13. It should be noted that the control operations at the step 104 and the step 106 are performed at substantially the same time. By this, the front wheels rotate freely as non-driving wheels. Then, the output of the engine is transmitted to the rear wheels 3 via the power transmission 9 for driving mechanically. Thus, the vehicle is driven in the rear two-wheel drive mode (step 108).

On the other hand, when the changeover switch 27 is held ON and thus the four-wheel drive signal $D_4$ is input to the main controller 23, the abnormality judgement for the hydraulic drive system is performed at a step 110. When the abnormality is detected, a process for notifying of the abnormality is performed (step 112), and then, the displacement of the variable hydraulic pump 15 is set at zero (step 104). In conjunction therewith, the clutches 14 are disconnected (step 106) to place the vehicle in rear two-wheel drive mode (step 108). On the other hand, when no abnormality is detected, the process is advanced to a step 114 to perform judgement as to whether there is rear wheel slippage.

At the step 114, judgement is made whether as to slippage is caused in the rear wheels 3. If slippage is not caused, the drive force for the front wheels 2 is set to be small (step 116). On the other hand, when the slippage is caused, the drive force for the front wheels 2 is set to be large (step 118).

Namely, when slippage is not caused for the rear wheels 2, the vehicle may satisfactorily travel by the driving force of the rear wheels. Therefore, the drive force for the front wheels is set smaller to make power consumption of the variable hydraulic pump 15 smaller to reduce power loss in the engine. Conversely, when the slippage is caused on the rear wheels 3, the vehicle may not be caused to travel by the drive force for the rear wheels. Therefore, the drive force for the front wheels 2 is increased to drive the vehicle in the four-wheel drive mode.

Next, discussion will be given with respect to judgement of slippage on the rear wheels 3.

The main controller 23 derives the front wheel rotation speed from the front wheel rotation speed signal output from the front wheel rotation speed sensor 29, and derives the rear wheel rotation speed from the input shaft rotation speed signal of the input shaft rotation sensor 19 of the power transmission 9 and the speed ratio range signal of the speed range detection sensor 20. When a quotient attained by dividing the front wheel rotation speed by the rear wheel rotation speed is in a range greater than or equal to one (for example, 1.1), and is maintained in that range for a given period (e.g. 0.1 second), wheel slippage of the rear wheels is judged. On the other hand, when the quotient attained by dividing the front wheel rotation speed by the rear wheel rotation speed is smaller than one, judgement can be made that wheel slippage is not caused.

The foregoing is the case during straight traveling. In case of turning, the front wheels 2 rotate at higher speed than the rear wheels 3, and the rotation speed ratio is variable depending upon the steering angle. Therefore, rear wheel slippage is judged in the following manner.

Namely, the front wheel rotation speed is derived as a half of a sum of the rotation speed $W_{FL}$ of the left front wheel 2 and the rotation speed $W_{FR}$ of the right front wheel 2. The main controller 23 preliminarily stores the rotation speed ratio between the front and rear wheels depending on the curve radius (steering angle). The curve radius is derived from the steering angle signal output from the steering angle sensor 28 to read out the rotation speed ratio corresponding to the curve radius as a correction coefficient $\alpha$ for multiplying the front wheel rotation speed to derive a front wheel rotation speed for comparison. Then, on the basis of the front wheel rotation speed for comparison and the rear wheel rotation speed, the rear wheel slippage is judged in a similar manner to the foregoing.

Next, the magnitude of the drive force for the front wheels will be discussed.

For making the drive force for the front wheels 2 small, the discharge pressure of the variable hydraulic pump 15, namely the pressures of the first and second main circuits 16 and 17, are set at low pressure.

By this, the pressure of the fluid to be supplied to the variable hydraulic motors 13 becomes a low pressure. Therefore, the drive torque developed by the variable hydraulic motors 13 becomes small to make the drive force for the front wheels small.

For making the drive force for the front wheels large, the discharge pressure of the variable hydraulic pump 15, namely the pressures of the first and second main circuits 16 and 17, are set at high pressure.

By this, the pressure of the fluid to be supplied to the variable hydraulic motors 13 becomes a high pressure. Therefore, the drive torque developed by the variable hydraulic motors 13 becomes large to make the drive force for the front wheels large.

More specifically, low pressure and high pressure are stored in the main controller 23. When no slippage is caused for the rear wheels, low pressure is set. On the other hand, when wheel slippage is caused for the rear wheels, high pressure is set.

Returning to FIG. 6, when the drive force for the front wheels is set in the manner set forth above, a target displacement of the variable hydraulic pump 15 is determined corresponding to the drive force of the front wheels, namely a set pressure (step 120). Through the main controller 23, a target displacement of the variable hydraulic pump is set by supplying power to the first solenoid 43a of the electromagnetic proportioning valve 43 (step 122).

Specifically, in the main controller 23, the displacements of the variable hydraulic pump 15 corresponding to the set pressures at low pressure and high pressure are stored. By outputting a current from the main controller 23 to the first solenoid 43a of the electromagnetic proportioning valve 43 for establishing the displacement of the variable hydraulic pump corresponding to the set low pressure or high pressure, a set displacement is established.

Next, the process is advanced to a step 124 where judgement is made as to whether the discharge pressure of the variable hydraulic pump 15 is the set pressure or not. When the discharge pressure is the set pressure, the capacity of the variable hydraulic motors 13 is controlled depending upon the vehicle speed (step 126). If the discharge pressure is not the set pressure, the displacement of the variable hydraulic pump 15 is controlled to correct the discharge pressure to correspond to the set pressure (step 128).

Specifically, the main controller 23 detects the pressure in the first main circuit 16 via the first pressure sensor 21. When the pressure is lower than the set pressure, the power supply for the first solenoid 43a of the electromagnetic proportioning valve 43 is increased to increase the displacement of the variable hydraulic pump 15. On the other hand, when the pressure is higher than the set pressure, the power supply for the first solenoid 43a of the electromagnetic proportioning valve 43 is decreased to decrease the displacement of the variable hydraulic pump 15.

By controlling the capacity of the variable hydraulic motors 13 as set forth above on the basis of the vehicle speed (speed ratio range of the power transmission), while the displacement of the variable hydraulic pump 15 is constant, the rotation speed of the front wheels 2 can be set at a speed corresponding to the vehicle speed.

For instance, when the power transmission is in the first speed ratio range, the magnitude of the power supply for the first solenoid 43a of the electromagnetic proportioning valve 43 becomes large to make the capacity of each of the variable hydraulic motors 13 large to drive at low speed. When the power transmission is in the second speed ratio range, the magnitude of power supply for the first solenoid 43a of the electromagnetic proportioning valve 43 is adjusted to be medium for driving each of the variable hydraulic motors 13 at medium speed. On the other hand, when the power transmission is in the third speed ratio range, the magnitude of power supply for the first solenoid 43a of the electromagnetic proportioning valve 43 is adjusted to be small to drive each of the variable hydraulic motors 13 at high speed.

Namely, the capacity of the variable hydraulic motors 13 means a flow rate per one cycle of revolution. By setting the capacity large, the flow rate per one cycle of revolution is increased. Therefore, even when the discharge flow rate of the variable hydraulic pump 15 is constant, revolution speed is varied by varying the displacement to become a value so that the front wheel rotation speed becomes a speed corresponding to a vehicle speed (rear wheel rotation speed).

As set forth above, after controlling the capacity of the variable hydraulic motors 13 depending upon the vehicle speed, judgement is made with respect to a clutch connecting condition at a step 130. When the connecting condition is satisfied, the clutches 14 are connected at a step 132 for four-wheel mode driving (step 134).

The conditions for establishing connection of the clutches 14 are that the same speed ratio range is maintained for a period longer than or equal to 1.3 seconds, the engine revolution speed is higher than or equal to a predetermined value (1070 r.p.m.), 1.2 seconds has passed from the outputting of a direct clutch ON signal from the torque converter or the torque converter mode is maintained, and the speed ratio range is either of the low speed ratio range or the reverse range. If these conditions are satisfied, the main controller 23 supplies the current to the solenoid 30a of the clutch switching valve 30 to be placed at the supply position a to supply the pressurized fluid to the pressure receiving chambers 14a of the clutches 14 to establish connection. On the other hand, if one of the conditions is not satisfied, the clutches 14 are placed in a disconnected condition (step 106).

In practice, the operation for establishing connection of the clutches 14 is differentiated from the above-described process in the flowchart shown in FIG. 6. However, for the purpose of illustration, it is shown in FIG. 6.

Next, discussion will be given for setting of the target displacement of the variable hydraulic pump 15.

As set forth above, by driving the variable hydraulic motors 13 while setting the capacity of the variable hydraulic motors 13 depending upon the speed ratio range and maintaining the displacement of the variable hydraulic pump 15 constant, four wheel drive mode is established by making the rotation speed of the front wheels 2 slightly higher than that of the rear wheels 3. Therefore, the target displacement of the variable hydraulic pump 15 is determined based on not only the set pressure but also the reduction ratio of the torque converter.

Namely, the variable hydraulic pump 15 is driven by the engine 7, and the engine output is transmitted to the rear wheels 3 via the torque converter 8. Therefore, even when the engine revolution speed is constant, the rotation speed of the rear wheels 3 can be differentiated when the reduction ratio of the torque converter 8 is different so as to make it impossible to synchronously rotate the front wheels 2 and the rear wheels 3.

Therefore, on the basis of the engine revolution speed and the input shaft rotation speed of the power transmission input into the main controller 23, the reduction ration of the torque converter is calculated through the following equation.

Reduction Ratio=Engine Revolution Speed/Input Shaft Rotation Speed

On the basis of the reduction ratio, the target displacement of the variable hydraulic pump 15 is corrected to set the real displacement of the variable hydraulic pump 15 corresponding to the reduction ratio of the torque converter.

By this, the front wheels 2 and the rear wheels 3 may rotate synchronously.

On the other hand, upon turning, it becomes important for smooth cornering to drive the front wheels 2 at higher rotation speed than that in the straight traveling state. Therefore, the target displacement of the variable hydraulic pump 15 is corrected on the basis of the steering angle.

Specifically, from the steering angle signal input to the main controller 23, the steering angle (curve radius) can be derived. The target displacement of the variable hydraulic pump 15 is increased proportionally to the magnitude of the steering angle to drive the variable hydraulic motors 13 at higher speed than that in the straight traveling state in proportion to the steering angle to rotate the front wheels 2 at higher speed.

The magnitude of the increase of the target displacement of the variable hydraulic pump 15 is determined on the basis of a distance between the axles of the front and rear wheels 2 and 3.

Next, discussion will be given for setting of the drive force of the front wheels after judgement with respect to the occurrence of rear wheel slippage.

As set forth above, while the drive force for the front wheels is set at large and small, the operating condition of the tipper is significantly variable. Therefore, for efficient four-wheel drive, the drive force may be varied at multiple stages depending upon the operating conditions in the following manner.

(1) When no slippage is caused for the rear wheel 3 (when drive force on the front wheels is small):

if no earth and sand is loaded on the rear body 5 (hereinafter referred to as an "empty state"), the set pressure is 30 to 150 kg/cm$^2$;

if earth and sand is loaded on the rear body 5 (hereinafter referred to as a "loaded state"), the set pressure is 50 to 200 kg/cm$^2$;

during hill-climbing in the empty state, the set pressure is 100 to 250 kg/cm$^2$; and during hill-climbing in the loaded state, the set pressure is 125 to 380 kg/cm$^2$.

(2) When slippage is caused for the rear wheels 3 (when drive force on the front wheels is large):

in the empty state, the set pressure is 80 to 300 kg/cm$^2$;

in the loaded state, the set pressure is 100 to 350 kg/cm$^2$;

during hill-climbing under empty state, the set pressure is 200 to 380 kg/cm$^2$; and during hill-climbing under loaded state, the set pressure is 300 to 380 kg/cm$^2$.

The foregoing set pressure is the pressure in the first primary circuit 16, namely the pressure at the high pressure side, and the pressure in the second primary circuit 17 as the low pressure side is 25 kg/cm$^2$, respectively.

Next, discussion will be given for the case where the variable hydraulic pump 15 and the variable hydraulic motors 13 are utilized as for braking.

Since the off-the-road tipper has a large vehicular weight, it is possible that the braking force developed by the brake and the retarder brake will become insufficient. Therefore, the variable hydraulic pump 15 and variable hydraulic motors 13 employed for four-wheel driving are utilized for providing a braking effect.

The details will be discussed hereinafter.

When the brake signal or retarder brake signal is input to the main controller 23, the main controller 23 controls the power supply magnitude for the first solenoid 43a of the electromagnetic proportioning valve 43 to be small to significantly reduce the target displacement of the variable hydraulic pump 15.

By this, the supply flow rate for the variable hydraulic motors 13 becomes smaller than the flow rate for rotatingly driving the front wheels 2. Then, the front wheels 2 are driven by the rear wheels 3 and thus the variable hydraulic motors 13 are driven by the front wheels 2 to perform a pumping effect.

When the variable hydraulic motors 13 are actively performing pumping, during forward traveling of the vehicle, the pressure in the second primary circuit 17 becomes high and the pressure in the first primary circuit 16 becomes low. With the high pressure in the second primary circuit 17, resistance against revolution of the variable hydraulic pump 15 is significantly increased to cause significant increase of the load against revolution of the engine 7. Therefore, a braking force is developed on the front wheels 2 to increase the overall braking force of the vehicle.

Since the braking force acting on the front wheels 2 is determined depending upon the pressure within the second primary circuit 17, a pressure for setting the braking force is set in the main controller 23 and when the pressure as monitored by the second pressure sensor 22 becomes greater than or equal to a set pressure, the power supply magnitude for the first solenoid 43a of the electromagnetic proportioning valve 43 of the variable hydraulic pump 15 is increased to make the displacement of the variable hydraulic pump 15 large to lower the pressure in the second primary circuit 17.

By this, the braking force of the front wheels can be maintained at the set braking force. Therefore, damage at respective portions can be prevented.

The braking force on the front wheels 2 is adapted to be set depending upon the operating condition of the tipper. The setting of the pressure for developing the brake force will be discussed hereinafter.

(1) When no slippage is caused for the rear wheels 3:

under the empty state, the set pressure is 30 to 150 kg/cm$^2$;

under the loaded state, the set pressure is 30 to 160 kg/cm$^2$;

on a down-hill grade (i.e. in a hill-descending state) under empty state, the set pressure is 100 to 200 kg/cm$^2$; and on a down-hill grade under the loaded state, the set pressure is 125 to 200 kg/cm$^2$.

(2) When slippage is caused for the rear wheels 3 (when drive force of the front wheels is large):

in the empty state, the set pressure is 50 to 200 kg/cm$^2$;

in the loaded state, the set pressure is 50 to 125 kg/cm$^2$;

on a down-hill grade in the empty state, the set pressure is 150 to 200 kg/cm$^2$; and on a down-hill grade in the loaded state, the set pressure is 150 to 250 kg/cm$^2$.

It should be noted that the pressure in the first primary circuit 16 is set at 25 kg/cm$^2$.

When no slippage is caused for the rear wheels 3, the discharge pressure of the variable hydraulic pump 15 becomes low to make the drive force on the front wheels small. Therefore, the engine output is not wasted. When slippage is caused for the rear wheels, the pressure in the variable hydraulic pump 15 becomes high to make the drive force on the front wheels large. Therefore, traveling ability in a muddy area and hill-climbing performance can be improved. Also, since the drive force for the front wheels is varied between large and small by adjusting the discharge pressure of the variable hydraulic pump 15 between high and low pressures, the drive force of the front wheels 2 can be increased without time lag from the generation of the rear wheel slippage, to permit smooth traveling.

Next, discussion will be given for displacement control of the variable hydraulic pump 15 during shifting of the transmission speed ratio.

In the four-wheel drive traveling state, the power is supplied for first solenoids 43a of respective electromagnetic proportioning valves 43 by the main controller 23 to set the displacement of the variable hydraulic pump 15 and the capacity of the variable hydraulic motors 13 at predetermined values to supply the discharge pressurized fluid from the variable hydraulic pump 15 to the variable hydraulic motors 13 to drive the latter and thus hydraulically drive the front wheels 2. In conjunction therewith, the driving force of the engine 7 is transmitted to the rear wheels 3 through the power transmission 9 for mechanically driving the rear wheels 3.

The speed range detection sensor 20 of the power transmission 9 detects the speed ratio range of the power transmission 9 and inputs the speed ratio range to the main controller 23. Upon shifting of the speed ratio of the power transmission 9, a shifting initiation signal and shifting completion signal, namely a shifting signal is input from the speed range detection sensor 20 to the main controller 23.

This is the case where automatic shifting of the speed ratio of the power transmission is performed. When the transmission gear position is manually shifted by a shift lever, the shift signal may be input to the main controller 23 from the shift lever.

The main controller is responsive to input of the shift initiation signal to terminate power supply for the solenoid 30a of the clutch switching valve 30 to place the latter at the drain position a. Then, the pressurized fluid in the pressure receiving chamber 14a of the clutch 14 is drained to disconnect the clutch 14.

By this, the output side of each of the variable hydraulic motors 13 and the front wheels 2 becomes discontinuous to place the front wheels 2 in a free rotation state according to travel of the vehicle. Therefore, it should not cause a problem even when the discharge amount of the variable hydraulic pump 15 is reduced due to lowering of the engine revolution speed upon initiation of shifting since no load will act on the variable hydraulic motors 13.

When the power transmission 9 completes the shifting operation, the shift completion signal is input to the main controller 23. The main controller 23 supplies power to the solenoid 30a of the clutch switching valve 30 to place the clutch switching valve at the supply position b, after a given period (namely a period required to resume the engine revolution speed to a predetermined value from completion of shifting) from inputting of the shift completion signal. Thus, the pressurized fluid is supplied to the pressure receiving chambers 14a of the clutches 14 to connect the latter to connect the output side of the variable hydraulic motors 13 to the front wheels 2.

By this, when connection of the clutch 14 is established and thus the output sides of the variable hydraulic motors 13 and the front wheels 2 are connected, the engine revolution speed has already been restored to the predetermined value and thus the discharge amount of the variable hydraulic pump 15 is the set value. Therefore, the torque of the variable hydraulic motors 13 becomes the set value to apply the set value of the drive force for the front wheels. Therefore, the drive force on the front wheels may not be abruptly varied during shifting to permit smooth traveling.

Figure 7:
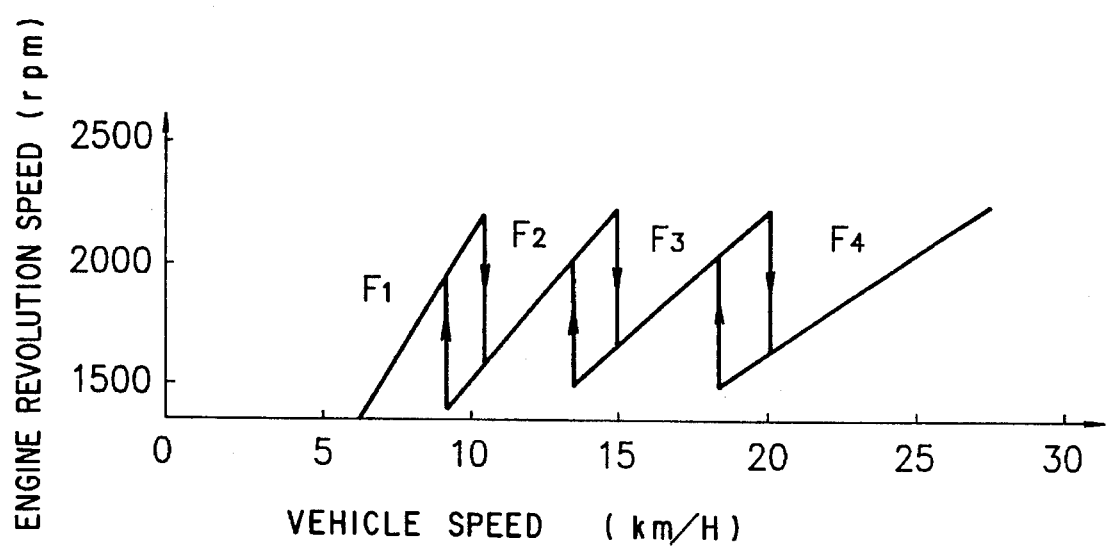
FIG. 7 is an illustration showing a relationship between the engine revolution speed, a speed ratio and a vehicle speed.
Figure 8A:
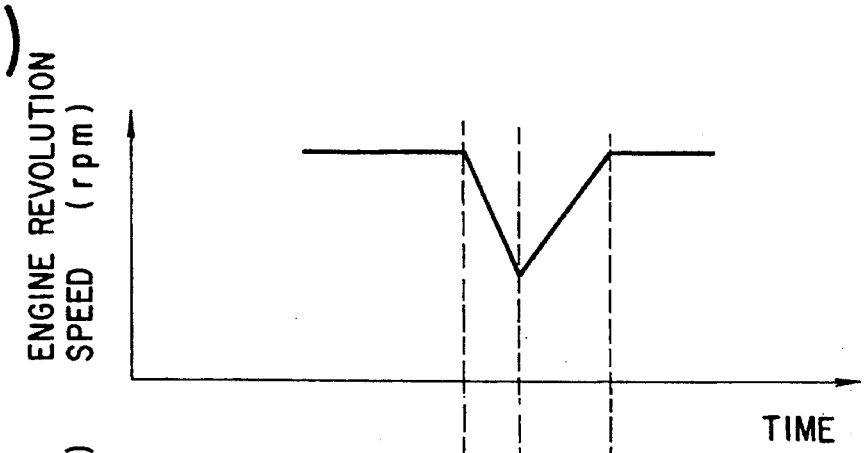
FIGS. 8(a), 8(b) and 8(c) are illustrations showing an engine revolution speed, a discharge amount and a pressure variation upon shifting of a transmission speed ratio.
Figure 8B:
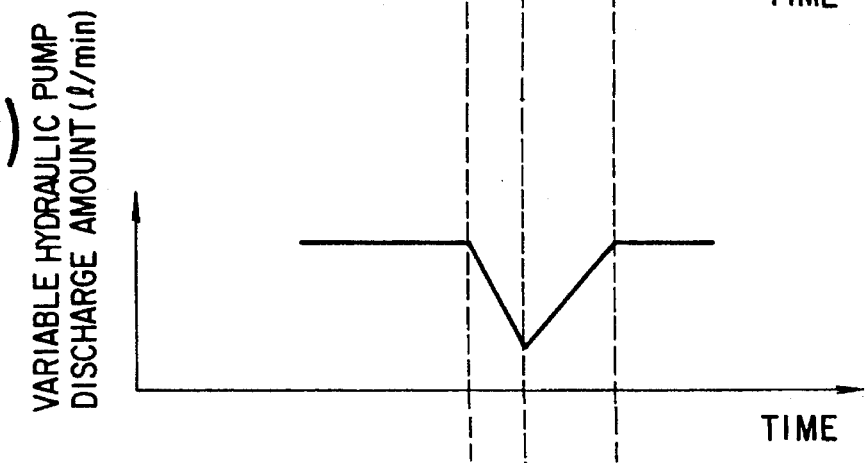
Figure 8C:
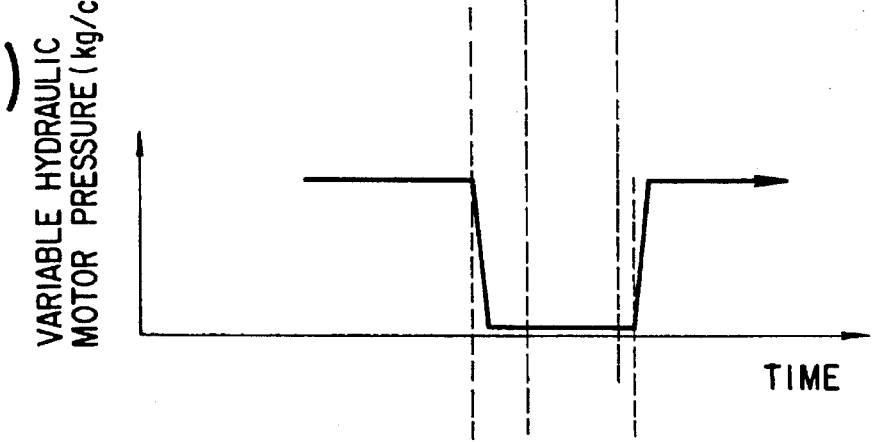

For instance, a relationship between the speed ratio range, the engine revolution speed and the vehicle speed is as shown in FIG. 7. Namely, upon shifting, the engine revolution speed is lowered and after completion of shifting, the engine revolution speed is gradually increased. Therefore, the engine revolution speed varies as shown in FIG. 8(a). Then, the discharge amount of the variable hydraulic pump 15 varies as shown in FIG. 8(b), and the pressure (torque) of the variable hydraulic motors 13 varies as shown in FIG. 8(c).

By disconnecting the clutches 14 to make the output sides of the variable hydraulic motors 13 and the front wheels 2 discontinuous upon shifting, and connecting the clutches 14 to connect the output side of the variable hydraulic motors 13 to the front wheels 2 after shifting, the drive force on the front wheels should not be varied abruptly even when the engine revolution speed is varied abruptly during a shifting operation. Thus, smooth traveling of the vehicle can be achieved.

Figure 9:
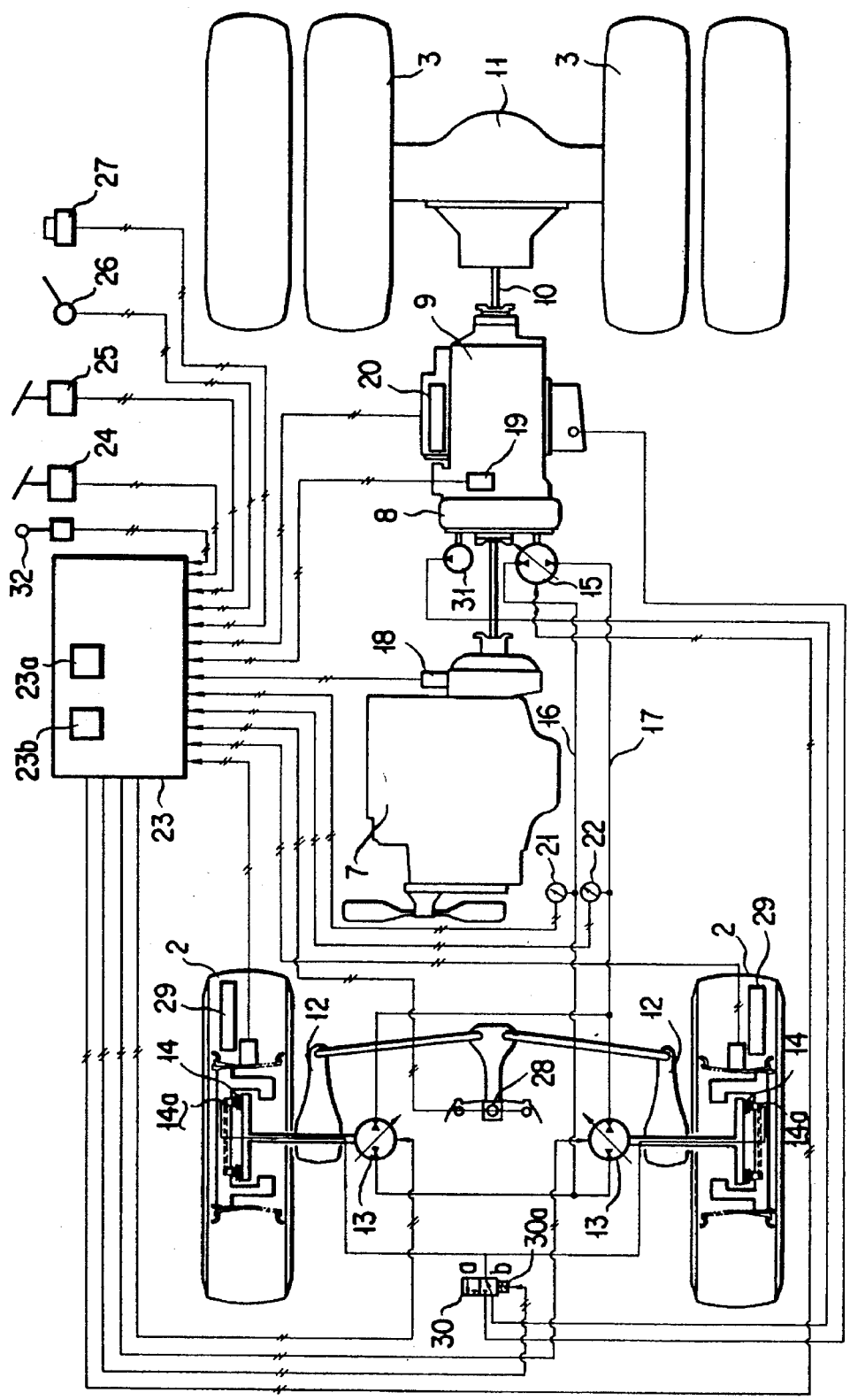
FIG. 9 is a general plan view of another embodiment of a four-wheel drive traveling system of the present invention.

FIG. 9 shows another embodiment of the four-wheel drive traveling system for the tipper according to the present invention. The shown embodiment is constructed by providing a function to operate in a normal traveling mode 23a and an abnormal traveling mode 23b for the main controller 23. When a normal traveling mode signal is input by a mode changeover switch 32, the operational mode of the main controller 23 becomes the normal traveling mode, and when an abnormal traveling mode signal is input, the operational mode of the main controller 23 becomes the abnormal traveling mode.

Figure 10:
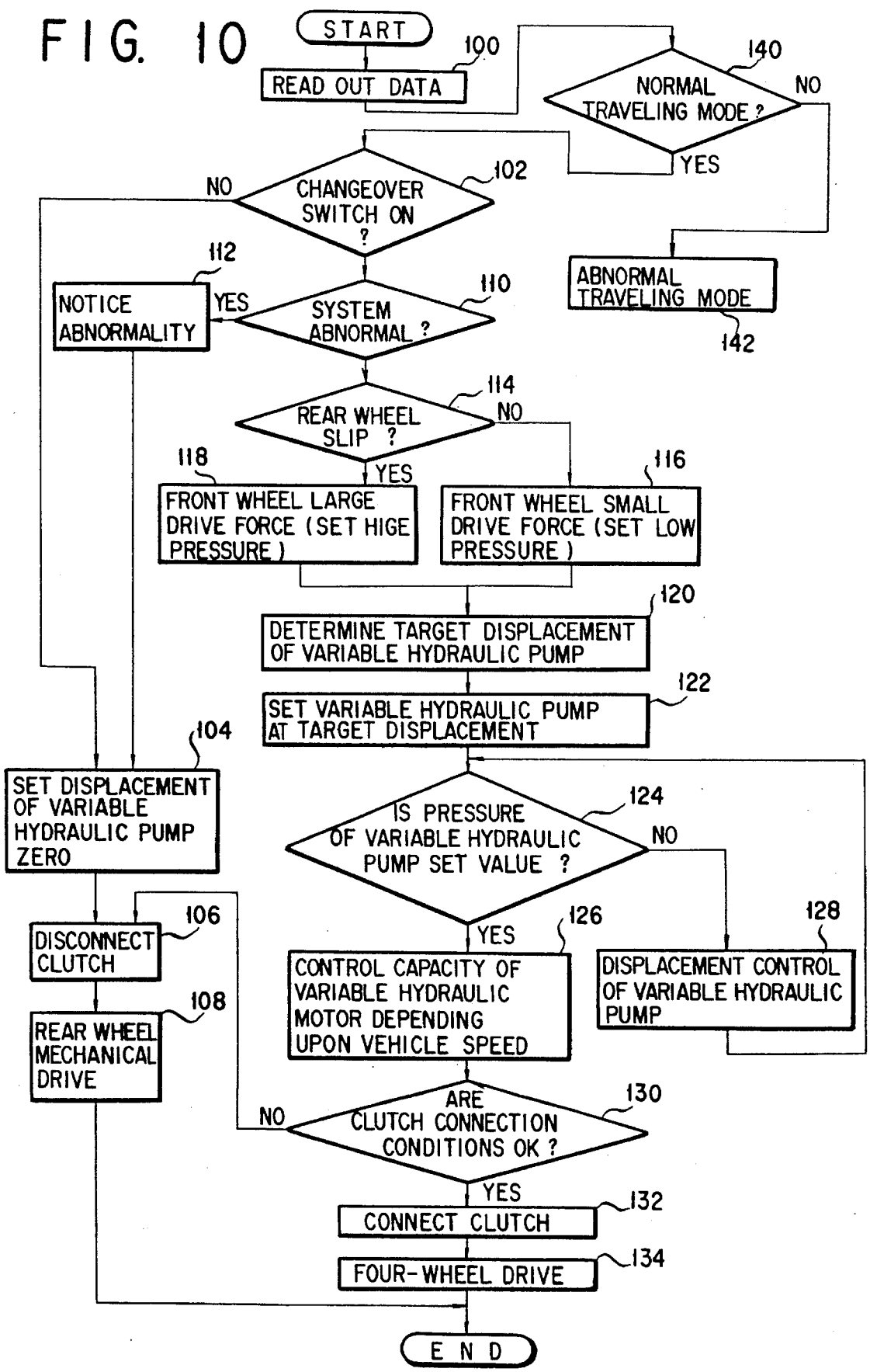
FIG. 10 is a flowchart showing an operation of a control system in the embodiment of the four-wheel drive traveling system as shown in FIG. 9.

FIG. 10 is a flowchart showing a control routine of the four-wheel drive traveling system of FIG. 9. All processes other than steps 140 and 142 are the same as those in FIG. 6.

Namely, after reading out the control parameters at the step 100, the mode signal from the mode changeover switch 32 is checked at the step 140. When the normal traveling mode signal is input, the same control operation as that discussed with respect to FIG. 6 is performed. On the other hand, when the abnormal travel mode signal is detected at the step 140, the process is transferred to an abnormal travel mode process (step 142).

Next, traveling control under the abnormal travel mode will be discussed with reference to FIG. 11.

In the abnormal travel control routine of FIG. 11, mode judgement is performed immediately after initiation of the process (step 200). If the normal travel mode signal is detected, the process is returned to the process in the routine of FIG. 10. Otherwise, in the abnormal travel mode process, at a step 202, a check is performed to determine whether a neutral position signal of the power transmission has been input or not. The judgement process at the step 202 is repeated until the power transmission is operated in the neutral position and the transmission neutral position signal is input to the main controller 23 from the speed range detection sensor 20.

At the step 202, when the neutral position signal of the power transmission is detected, the main controller supplies the maximum magnitude of power to the first solenoid 43a of the variable hydraulic pump 15 to make the displacement of the variable hydraulic pump 15 maximum (step 204) and the maximum magnitude of power is supplied to the first solenoid 43a of the electromagnetic proportioning valve 43 of each of the variable hydraulic motors 13 to make the capacity of the variable hydraulic motors 13 maximum (step 206). In conjunction therewith, the power is supplied to the solenoid 30a of the clutch switching valve 30 to connect the clutches 14 by setting the clutch switching valve at the supply position a (step 208). By this, the rear wheels are disconnected from the engine and placed in a non-driven state. Then, since the front wheels are driven by the hydraulic motors, the vehicle is in the front two-wheel drive state (step 210).

By this, the discharge amount per one cycle of revolution per unit period becomes maximum to make the discharge amount per the unit period maximum. Then, the flow rate per one cycle of revolution of the variable hydraulic motors 13 becomes maximum. Therefore, the drive force on the front wheels becomes maximum to permit traveling of the vehicle. At this time, the traction force becomes maximum.

Therefore, in an abnormal state of the mechanical transmission device, such as failure of the torque converter 8, the power transmission 9, drop out or damaging of the propeller shaft 10 or failure of the differential gear box 11, the maximum traction force can be developed by the variable hydraulic pump 15 and the variable hydraulic motors 13.

Accordingly, by selectively setting the abnormal travel mode by means of the mode selector switch 32 and by placing the transmission 9 at the neutral position, the displacement of the variable hydraulic pump 15 and the capacity of the variable hydraulic motors 13 becomes maximum to develop the maximum torque for the output of the variable hydraulic motors. Therefore, the front two wheels can be driven at the maximum drive force. Also, when the mechanical transmission system connecting the engine 7 and the rear wheels 3 fails so that it is impossible to drive the rear wheels, the maximum traction can then be developed utilizing the variable hydraulic pump 15 and variable hydraulic motors 13.

Although the invention has been illustrated and described with respect to exemplary embodiments thereof, it should be understood by those skilled in the art that the foregoing and various other changes, omissions and additions may be made therein and thereto, without departing from the spirit and scope of the present invention. Therefore, the present invention should not be understood as limited to the specific embodiments set out above but to include all possible embodiments which can be embodied within the scope of the appended claims and equivalents thereof.

We claim:

1. A four-wheel drive traveling system for a tipper having rear wheels and front wheels, an engine with an output side connected to the rear wheels via a power transmission, at least one variable hydraulic motor drivingly coupled with the front wheels, and a variable hydraulic pump driven by the engine and coupled with the at least one variable hydraulic motor, said four-wheel drive traveling system comprising a control system including:

at least one clutch for releasably connecting said at least one variable hydraulic motor to the front wheels;

means for controlling displacement of the variable hydraulic pump;

means for detecting a shifting operation of the power transmission; and means for releasing said at least one clutch to disconnect said at least one variable hydraulic motor from the front wheels on the basis of a shifting operation detection signal.

2. A four-wheel drive traveling system as recited in claim 1, wherein said releasing means comprises means for releasing said at least one clutch to disconnect said at least one variable hydraulic motor from the front wheels in response to a shifting initiation signal, and for causing said at least one clutch to connect said at least one variable hydraulic motor to the front wheels after a given time period from receipt of a shifting completion signal.

3. A four-wheel drive traveling system for a tipper having rear wheels and front wheels, an engine with an output side connected to the rear wheels via a power transmission, at least one variable hydraulic motor drivingly coupled with the front wheels, and a variable hydraulic pump driven by the engine and coupled in a circuit with the at least one variable hydraulic motor, said four-wheel drive traveling system comprising a control system including:

means for controlling displacement of the variable hydraulic pump;

means for controlling capacity of the at least one variable hydraulic motor;

a main controller having a normal travel mode and an abnormal travel mode, and a mode changeover switch, wherein during said normal travel mode, said main controller controls displacement of the variable hydraulic pump and capacity of the at least one variable hydraulic motor depending upon a rear wheel rotation speed, and wherein during said abnormal travel mode, said main controller operates to make the displacement of the variable hydraulic pump and the capacity of the at least one variable hydraulic motor maximum upon receipt of a transmission neutral signal.

4. A four-wheel drive traveling system for a tipper having rear wheels and front wheels, an engine with an output side connected to the rear wheels via a power transmission, at least one variable hydraulic motor drivingly coupled with the front wheels, and a variable hydraulic pump driven by the engine and coupled in a closed circuit with the at least one variable hydraulic motor via first and second primary circuits, said four-wheel drive traveling system comprising a hydraulic drive abnormality detection system including:

- means for detecting pressures of the first and second primary circuits, respectively;
- means for ascertaining an abnormal value of the pressures detected by said detecting means; and
- a display device for displaying an abnormality signal when an abnormal value of the pressures detected by said detecting means is ascertained by said ascertaining means.

5. A four-wheel drive traveling system as recited in claim 4, wherein

- said at least one variable hydraulic motor is connected to said front wheels via at least one clutch and is switchable between a four wheel drive mode and a two wheel drive mode by engaging and releasing said clutch, respectively;
- while said at least one clutch is released for two wheel driving, an abnormality is detected when the pressure in one of said first and second primary circuits is higher than or equal to a predetermined pressure;
- while said at least one clutch is engaged for four wheel driving, an abnormality is detected when there is no difference between pressures in said first and second primary circuits;
- while said at least one clutch is engaged for four wheel driving one of said first and second primary circuits serves as a driving side circuit, and the other of said first and second primary circuits serves as a driven side circuit;
- while said clutch is engaged for four wheel driving, an abnormality is detected when a condition, in which the pressure in said driving side circuit is low and the pressure in said driven side circuit is high, is maintained for a predetermined period;
- while said clutch is connected for four wheel driving, an abnormality is detected when a condition, in which the pressure in said driving side circuit is out of a set pressure range, is maintained for a predetermined time period; and
- while said clutch is connected for four wheel driving, an abnormality is detected when a condition in which the pressures of said first and second primary circuit are maintained lower than a predetermined pressure, is maintained for a predetermined time period.

6. A four-wheel drive traveling system as recited in claim 4, further comprising

- at least one clutch for releasably connecting said at least one variable hydraulic motor to the front wheels, so as to cause four wheel driving when said at least one clutch is engaged and two wheel driving when said at least one clutch is released;
- wherein, when said at least one clutch is engaged, one of said first and second primary circuits constitutes a driving side circuit, and the other of said first and second primary circuits constitutes a driven side circuit; and
- wherein said ascertaining means operates to ascertain an abnormality when:
- said at least one clutch is released for two wheel driving, and the pressure in one of said first and second primary circuits is greater than or equal to a predetermined pressure;
- said at least one clutch is engaged for four wheel driving, and the pressures in said first and second primary circuits are equal;
- said at least one clutch is engaged for four wheel driving, and a condition, in which the pressure in said driving side circuit is lower than the pressure in said driven side circuit, is maintained for a predetermined period of time;
- said at least one clutch is engaged for four wheel driving, and a condition, in which the pressure in said driving side circuit is outside of a set pressure range, is maintained for a predetermined period of time; or
- said at least one clutch is engaged for four wheel driving, and a condition, in which the pressures of said first and second primary circuits are lower than a predetermined pressure, is maintained for a predetermined period of time.

7. A four-wheel drive traveling system for a tipper having rear wheels and front wheels, an engine with an output side connected to the rear wheels via a power transmission, at least one variable hydraulic motor drivingly coupled with the front wheels, and a variable hydraulic pump driven by the engine and coupled in a circuit with the at least one variable hydraulic motor, said four-wheel drive traveling system comprising a control system including:

- means for controlling displacement of the variable hydraulic pump;
- means for setting a discharge pressure of said variable hydraulic pump at either a high discharge pressure or a low discharge pressure;
- means for detecting a steering angle of said front wheels;
- means for detecting rear wheel slippage by comparing the front wheel rotation speed with the rear wheel rotation speed, the front wheel rotation speed being determined by obtaining a rotation speed value by dividing a sum of the rotation speeds of the left and right front wheels in half and then correcting the rotation speed value by multiplying the rotation speed value by a correction coefficient corresponding to the steering angle detected by said steering angle detecting means; and
- means for controlling said setting means so that the discharge pressure of said variable hydraulic pump is set at said low discharge pressure when no rear wheel slippage is detected, and so that the discharge pressure of said variable hydraulic pump is set at said high discharge pressure when rear wheel slippage is detected.

8. A four-wheel drive traveling system for a tipper having rear wheels and front wheels, an engine with an output side connected to the rear wheels via a power transmission, at least one variable hydraulic motor drivingly coupled with the front wheels, and a variable hydraulic pump driven by the engine and coupled in a circuit with the at least one variable hydraulic motor, said four-wheel drive traveling system comprising a control system including:

- means for controlling displacement of the variable hydraulic pump;
- means for setting a discharge pressure of said variable hydraulic pump at either a high discharge pressure or a low discharge pressure;
- means for detecting rear wheel slippage;
- means for controlling said setting means so that the discharge pressure of said variable hydraulic pump is set at said low discharge pressure when no rear wheel slippage is detected, and so that the discharge pressure of said variable hydraulic pump is set at said high discharge pressure when rear wheel slippage is detected;

means for detecting a braking state of the tipper; and means for causing said displacement controlling means to reduce displacement of said variable hydraulic pump to a magnitude which causes a pumping effect of said at least one variable hydraulic motor such that said at least one variable hydraulic motor causes a braking resistance of the front wheels, upon detection of a braking state by said braking state detecting means.

9. A four-wheel drive traveling system for a tipper having rear wheels and front wheels, an engine with an output side connected to the rear wheels via a power transmission, at least one variable hydraulic motor drivingly coupled with the front wheels, and a variable hydraulic pump driven by the engine and coupled in a circuit with the at least one variable hydraulic motor, said four-wheel drive traveling system comprising a control system including:

means for controlling displacement of the variable hydraulic pump;

means for setting a discharge pressure of said variable hydraulic pump at either a high discharge pressure or a low discharge pressure;

means for detecting rear wheel slippage;

means for controlling said setting means so that the discharge pressure of said variable hydraulic pump is set at said low discharge pressure when no rear wheel slippage is detected, and so that the discharge pressure of said variable hydraulic pump is set at said high discharge pressure when rear wheel slippage is detected; and means for setting the discharge pressure of said variable hydraulic pump at respectively different levels in an empty state of the tipper, a loaded state of the tipper, a hill-climbing state of the tipper and a hill-descending state of the tipper.

10. A four-wheel drive traveling system for a tipper having rear wheels and front wheels, an engine with an output side connected to the rear wheels via a power transmission, at least one variable hydraulic motor drivingly coupled with the front wheels, and a variable hydraulic pump driven by the engine and coupled in a circuit with the at least one variable hydraulic motor, said four-wheel drive traveling system comprising a control system including:

means for controlling displacement of the variable hydraulic pump;

means for setting a discharge pressure of said variable hydraulic pump;

means for detecting an actual input pressure to said at least one variable hydraulic motor;

means for outputting a capacity control signal for said displacement controlling means on the basis of a difference between the discharge pressure set by said discharge pressure setting means and the actual input pressure detected by said actual input pressure detecting means; and means for setting the discharge pressure of said variable hydraulic pump at respectively different levels in an empty state of the tipper, a loaded state of the tipper, a hill-climbing state of the tipper and a hill-descending state of the tipper.

\* \* \* \* \*